United States Patent [19]
Kirby

[11] Patent Number: 5,199,517
[45] Date of Patent: Apr. 6, 1993

[54] COUNTING ARTICLES

[76] Inventor: John Kirby, 364A Manchester Old Road, Middleton, Manchester, M24 4EB, England

[21] Appl. No.: 632,369

[22] Filed: Dec. 21, 1990

Related U.S. Application Data

[63] Continuation-in-part of Ser. No. 386,293, Jul. 27, 1989, abandoned.

[30] Foreign Application Priority Data

Aug. 4, 1988 [GB] United Kingdom ............... 8818511

[51] Int. Cl.$^5$ .......................................... G01G 19/42
[52] U.S. Cl. ................................................ 177/25.17
[58] Field of Search ............... 177/25.14, 25.18, 25.19, 177/200, 25.17

[56] References Cited

U.S. PATENT DOCUMENTS

| | | | |
|---|---|---|---|
| 4,157,738 | 6/1979 | Nishiguchi et al. | 177/1 |
| 4,629,016 | 12/1986 | Knothe et al. | 177/24.15 |
| 4,646,767 | 3/1987 | Hikita | 177/200 X |
| 4,674,060 | 6/1987 | Larkin et al. | 177/200 X |
| 4,685,525 | 8/1987 | Knothe et al. | 177/200 X |
| 4,828,054 | 5/1989 | Mosher | 177/25.18 |

FOREIGN PATENT DOCUMENTS

| | | |
|---|---|---|
| 0091274 | 10/1983 | European Pat. Off. |
| 0124976 | 11/1984 | European Pat. Off. |
| 1591079 | 6/1981 | United Kingdom |
| 2076979 | 12/1981 | United Kingdom |
| 2155190 | 9/1985 | United Kingdom |
| 2158597 | 11/1985 | United Kingdom |

*Primary Examiner*—George H. Miller, Jr.
*Attorney, Agent, or Firm*—Renner, Otto, Boisselle & Sklar

[57] ABSTRACT

A method and apparatus for counting articles having a nominal weight and a statistical distribution of weights by predetermining a minimum batch weight of a batch of the articles in relation to the statistical distribution of weights such that a maximum rounding-off error of the dividend of the batch weight by the nominal weight is less than 0.5 so that on rounding-off, the dividend is equal to the number of the articles in the batch. Articles are added successively on a continuing basis to a weighting apparatus, and the batch weight is noted each time the minimum batch weight is added. An article count is maintained as articles are added to the weight apparatus and the article count is incremented by the batch number each time the minimum batch weight is added. The weighing apparatus is re-zeroed every time a batch weight is attained to eliminate a fractional weight giving rise to the rounding-off error.

5 Claims, 1 Drawing Sheet

COUNTING ARTICLES

This application is a continuation in part of U.S. Pat. application Ser. No. 07/386,293, filed Jul. 27, 1989, now abandoned.

BACKGROUND TO THE INVENTION

This invention relates to counting articles such for example as tablets dispensed by pharmacists.

It is known to count articles by weighing and dividing the weight by a nominal article weight. The dividend, which will usually involve an extraneous fraction, is rounded off to a whole number, since it is usually inconsistent to speak of a fraction of an article especially in the case of tablets.

However, since article weights, and particularly tablet weights, can vary significantly from their nominal weight, this weighing method can give erroneous count values. For example, if tablets having a nominal weight of one gram could have actual weights between 0.9 and 1.1 grams, the count as calculated from weighing out 100 grams would be 100 but in actuality the number could by anything between 91 and 111.

Such an error could be both economically and pharmaceutically unacceptable.

SUMMARY OF THE INVENTION

The present invention provides a method and apparatus by which counting by weight can be carried out to an absolute or at least acceptable standard of accuracy.

The invention comprises in a method for counting articles having a nominal weight and a statistical distribution of weights by weighing the articles and computing the dividend of the weight by the nominal weight to give the number of articles as being equal to the dividend suitably rounded off to the nearest integer, the improvement comprising :

predetermining the minimum batch weight of a batch of the articles in relation to the said statistical distribution such that the maximum rounding-off error of the dividend of the batch weight by the nominal weight is less than 0.5 so that on rounding-off the dividend is equal to the number of the articles in the batch (the batch number), weighing the articles by adding them successively on a continuous basis to a weighing apparatus, noting the batch weight each time the minimum batch weight is added to the weighing apparatus, maintaining an article count as articles are added to the weighing apparatus and the incrementing article count by the batch number each time the minimum batch weight is added to the weighing apparatus, and re-zeroing the weighing apparatus every time a batch weight is attained to eliminate the fractional weight giving rise to the rounding-off error.

The invention has the result that improved counting is achieved without any improvement in the accuracy of weighing (which also, of course, has to be taken into account in ascertaining the error in the weight of articles, as compared to the nominal weight). Such improvement might be expensively obtained, but would not be accompanied by a corresponding improvement in the count accuracy which, after a point, would be mainly if not entirely dependent upon the accuracy to which nominal weight is held in the articles themselves, when the counting is done conventionally by weighing a total batch without regard to the possibilities of error due to the statistical spread of actual article weights.

The invention need not result in the number count being exact—it may well be that there is a tolerance of say 1% or 2% in the actual number count. Such a result could be achieved by using larger batch weights than would result in an exact count. Indeed, taking into account the probability that the actual weight distribution will be normal about the nominal (which, of course, cannot necessarily be assumed) the batch weights could be substantially larger than is necessary on the assumption that absolute accuracy is required even of a batch where every article has the maximum weight error in the same direction, i.e. all the articles are the heaviest possible, or the lightest.

Depending upon the actual weight distribution, different batch sizing rules will give more or less accurate counts. It is, according to the invention, quite possible to bring about any desired degree of improvement over a single weighing of a total batch, by selecting the batch size for the weighing of individual batches, while still maintaining the advantages in terms of speed of batch weighing.

The kinetic effect of falling articles could be dealt with by assuming a constant kinetic effect which would have no resultant on consecutive batch weighings, or in the event of irregular article feeding, by a correction factor dependent upon the rate of weight increase.

The invention also comprises apparatus for counting articles having a nominal weight and a statistical distribution of their weights by weighing the articles and dividing the weight by the nominal weight, comprising :

weighing means for weighing the articles and article feed means for adding the articles successively to the weighing means on a continuous basis, computing means operatively connected to the weighing means to determine when a batch weight equal to or greater than a predetermined minimum weight of articles (the minimum batch weight) is added to the weighing means, said minimum batch weight having been predetermined in relation to the statistical distribution of weights of the articles and their nominal weight and programmed to maintain an article count a articles are added to the weighing means and to increment the article count by a batch number equal to the rounded off dividend of the batch weight by the nominal weight.

BRIEF DESCRIPTION OF THE DRAWINGS

Embodiments of apparatus and methods for counting articles according to the invention will now be described with reference the accompanying drawings, in which.

DETAILED DESCRIPTION OF THE PREFERRED EMBODIMENT

Figure 1:
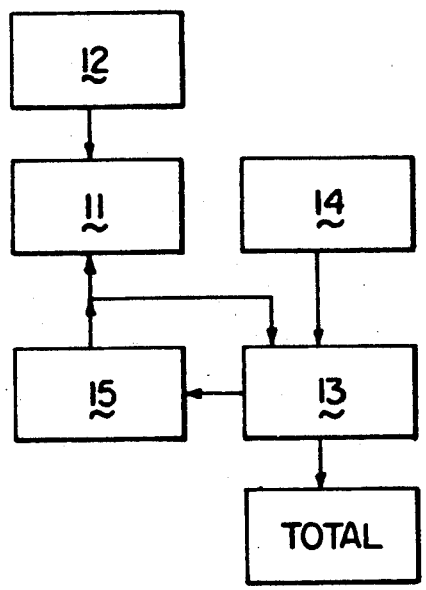
FIG. 1 is a diagrammatic illustration of one embodiment of apparatus.
Figure 2:
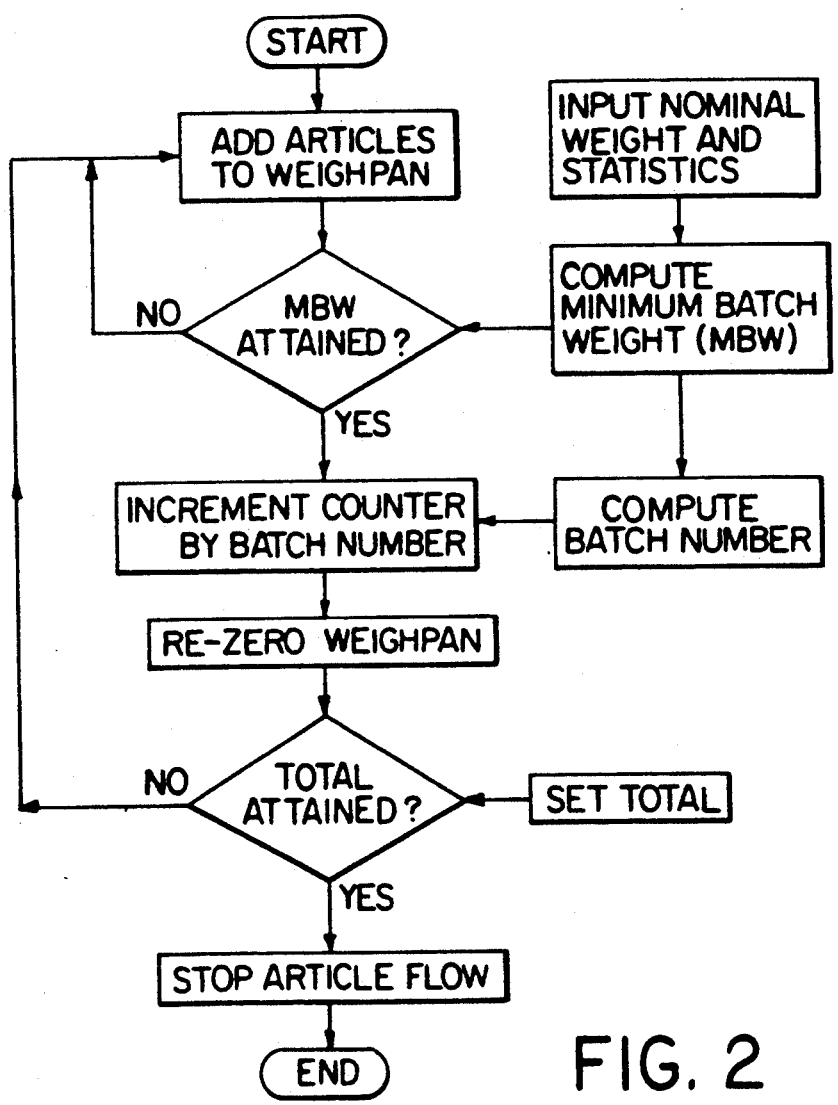
FIG. 2 is a flow chart.

The apparatus illustrated in FIG. 1 and the flow chart of FIG. 2 relate to counting articles having a nominal weight by weighing the articles and dividing the weight by the nominal weight to yield the number of articles weighed.

The apparatus comprises weighing means 11 of any suitable type. The weighing means 11 are supplied with articles by a feed means 12 which may be a hopper with a chute controlled by a valve.

The apparatus also comprises computing means 13, which may digitise the weight signals from the weighing means 11.

Input means, e.g. keyboard or keypad means 14, can be used to input to the computing means 13 the nominal and minimum batch weights of the articles, the latter being determined from the statistical distribution of the weights.

The minimum batch weight may be calculated mentally from knowledge of the distribution and the nominal weight; there will be a known maximum error (which can be determined by sampling with such accuracy as may be required) between the weight of any article and the nominal weight. The minimum batch weight can be selected to be less than half the nominal weight divided by the maximum error.

However, this computation can also be effected by the computer which may generate its own statistics from the individual weights of the articles recorded as they flow from the chute.

The batch number is computed as the rounded-off-dividend of the minimum batch weight by the nominal weight.

The keyboard can also input a final total weight at which the valve-controlled chute is closed.

A discriminator 15 can, on equalisation of the digitised batch weight with the minimum batch weight, actuate the computing means 13 to increment the batch count by the batch numbers Even if the batch is bigger than that which gives rise to the situation just described, it may still represent a very useful number count, the accuracy of which can be derived from statistical consideration.

I claim

1. In a method for counting articles having a nominal weight and a statistical distribution of weights by weighting the articles and computing a dividend of the weight of the weighed articles by dividing the nominal weight into the weight of the weighed articles to give a number of articles as being equal to the dividend suitably rounded off to a nearest integer, the improvement comprising:

predetermining a minimum batch weight of a batch of the articles in relation to the said statistical distribution of weights such that a maximum rounding-off error of the dividend of the batch weight by the nominal weight is less than 0.5 so that on rounding-off the dividend is equal to the number of the articles in the batch (the batch number), adding the articles successively on a continuous basis to a weighing apparatus, noting the batch weight each time the minimum batch weight is added to the weighing apparatus, maintaining an article count as articles are added to the weighing apparatus and incrementing the articles count by the batch number each time the minimum batch weight is added to the weighing apparatus, and re-zeroing the weighing apparatus every time a batch weight is attained to eliminate a fractional weight giving rise to the rounding-off error.

2. A method according to claim 1, for counting articles having a statistical distribution of their weights such that there is a known maximum error between the weight of any article and the nominal weight, in which the minimum batch weight is selected to be less than half the nominal weight divided by the said maximum error.

3. Apparatus for counting articles having a nominal weight and a statistical distribution of their weights by weighing the articles and dividing the weight of the weighed articles by the nominal weight to give a number of articles as being equal to a dividend suitably rounded-off to a nearest integer, comprising:

weighing means for weighing the articles and article feed means for adding the articles successively to the weighing means on a continuous basis, computing means operatively connected to the weighing means to determine when a batch weight equal to or greater than a predetermined minimum weight of articles (the minimum batch weight) is added to the weighing means, said minimum batch weight having been redetermined in relation to the statistical distribution of weights of the articles and their nominal weight such that a maximum rounding-off error of the dividend of the batch weight by the nominal weight is less than 0.5 and programmed to maintain an article count as articles are added to the weighing means and to increment the article count by a batch number equal to a rounded-off dividend of the batch weight by the nominal weight.

4. Apparatus according to claim 3, in which said article feed means comprise a hopper, a chute and a valve controlling the supply of articles therefrom.

5. Apparatus according to claim 3, further comprising means for re-zeroing the weighing apparatus every time a batch weight is attained to eliminate the fractional weight giving rise to the rounding-off error.

* * * * *